Patented Mar. 25, 1947

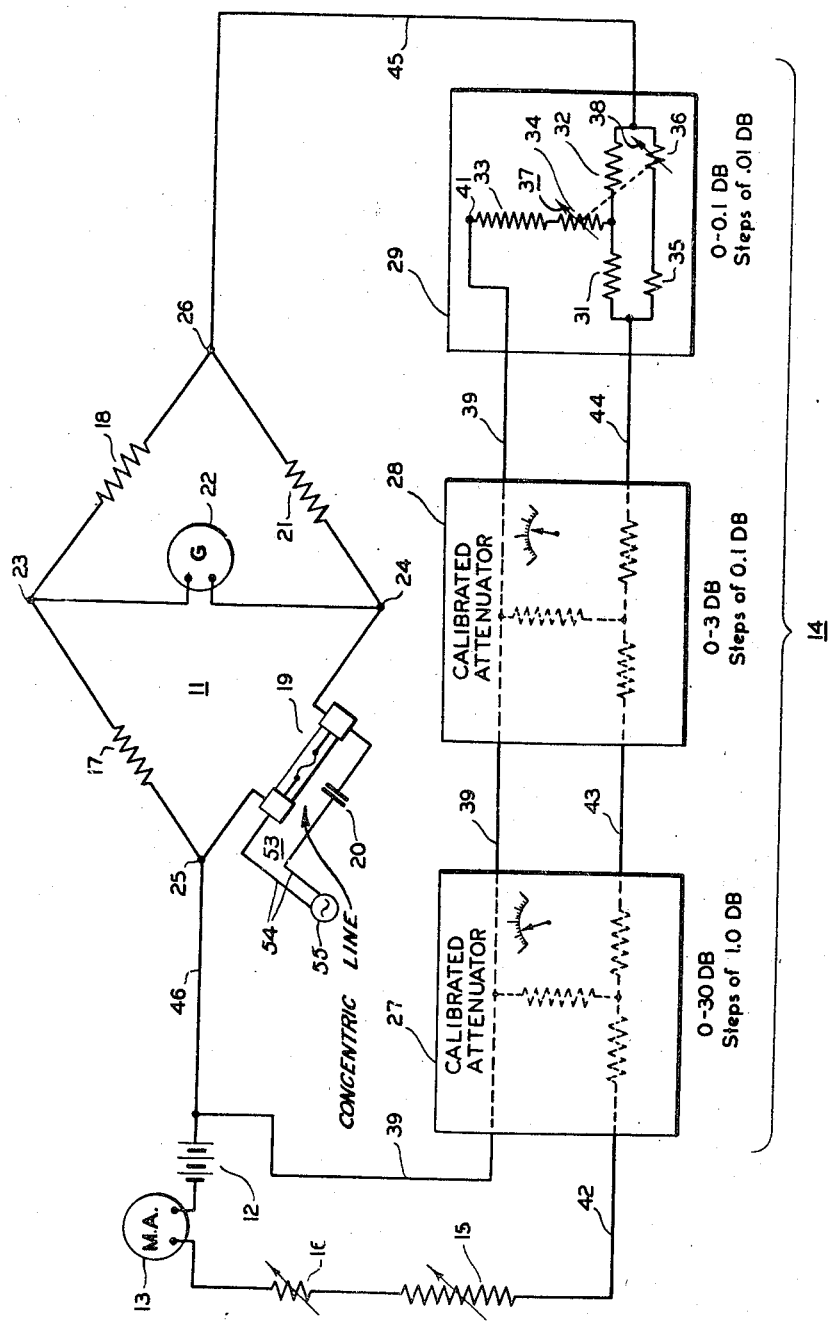

2,417,820

UNITED STATES PATENT OFFICE 2,417,820

POWER-MEASURING BRIDGE

Edward L. Ginzton, Garden City, N. Y., assignor to Sperry Gyroscope Company, Inc., a corporation of New York Application November 3, 1943, Serial No. 508,804

2 Claims. (Cl. 171—95)

The present invention relates to power measurement and has for its principal object the provision of improved methods and apparatus for measuring power, particularly at high frequencies.

More specifically, this application relates to high frequency power measuring bridge circuits such as that disclosed in copending application Serial No. 429,508 for High frequency power measuring device, filed February 4, 1942, in the names of W. W. Hansen, J. R. Woodyard and E. L. Ginzton. The present invention may be considered an improvement over that disclosed in said copending application.

An object of the invention is to provide an improved power bridge having a hot wire element, the resistance of which is maintained constant.

An object of the invention is to provide a Wollaston wire type of balanced bridge by means of which low power measurements may be made accurately.

Still another object of the invention is to provide apparatus for measuring alternating current power in a direct current bridge by the substitution method.

Still another object is to provide a direct current power bridge with means for absorbing excess power and maintaining constant power dissipation in the hot wire unit as alternating current power input is varied.

Other and further objects and advantages will become apparent as the description proceeds.

In carrying out the invention in its preferred form, a hot wire element is employed in which the alternating current power to be measured is dissipated. A direct-current source is utilized for heating the wire. Means are provided for ascertaining the direct-current power consumption both when alternating current is applied and when alternating current power is absent and for maintaining the total power dissipation of the hot wire constant, in order that the difference in the two values of direct-current power will represent the alternating-current power measured. In order to maintain the power dissipation constant, means are provided for measuring the resistance of the hot wire and holding it at a constant value. To this end, the hot wire is made one arm of a resistance bridge. In order to make it unnecessary to detect small variations in direct current power input to the bridge directly when the alternating current power varies, the apparatus is arranged for a fixed power output from a direct current source. As the alternating current power input to the hot wire unit varies, the requisite variations in direct current power input to the hot wire unit for maintaining the hot wire resistance constant are accomplished by absorbing the excess power in calibrated attenuator units which provide a constant impedance across the direct current source. The attenuator units are adjustable to absorb varying amounts of power from the direct current source without affecting the total power absorbed therefrom and may be so calibrated that the alternating current power may be read directly from the settings of the attenuator units.

A better understanding of the invention will be afforded by the following detailed description, considered in conjunction with the accompanying drawing.

The form of the invention shown for the sake of illustration in the drawing comprises a direct current bridge 11, a source of direct current 12, such as a single dry cell for energizing the bridge, means for measuring the direct current input to the bridge, such as a milliammeter 13, and attenuator apparatus 14 for absorbing excess direct current power input to the bridge. For initially adjusting the direct current power input to the bridge to give a zero reading when there is no alternating current input, coarse and fine series rheostats 15 and 16 are preferably provided.

The bridge 11 comprises four resistance elements 17, 18, 19 and 21 in series parallel, and a null indicating device, such as a galvanometer 22 connected as a diagonal arm of the bridge between conjugate points 23 and 24. Two other conjugate points 25 and 26 are connected in series with the direct current input source 12, the instrument 13, and the adjusting rheostats 15 and 16 as in a conventional Wheatstone bridge. One of the bridge arms 19 may take the form of a hot wire or Wollaston wire unit of a type heretofore known, having means such as a length of concentric transmission line 53, represented merely schematically by a parallel conductor pair with an interposed D.-C. isolating condenser 20 for supplying alternating current power, more particularly, high frequency or microwave radio frequency energy from a source 55 to the wire 19 simultaneously with the passage of direct current through the Wollaston wire unit. A hot-wire holder of any suitable type may be employed, e. g., one such as disclosed in one of the copending applications of Arthur E. Harrison, Serial No. 509,889, filed November 11, 1943, and Hugh E. Webber, Serial No. 513,164, filed December 6, 1943, Serial No. 514,109, filed December 13, 1943, Serial No. 514,111, filed December 13, 1943.

The resistors 17, 18 and 21 are preferably standard resistors so constructed as to maintain substantially constant resistance. The resistance values are so chosen that the bridge 11 is balanced when the Wollaston wire unit 19 has a resistance corresponding to the maximum safe value of power input and heating. For maximum accuracy, the resistances of the four arms of the bridge are preferably equal.

The power absorption apparatus 14 comprises one or more calibrated attenuators, for example, decibel attenuators. For example, there may be a pair of conventional T pads or T-type Daven attenuators 27 and 28 arranged for coarse and intermediate steps of adjustment, respectively, and a third attenuator 29 designed for exceedingly fine steps of adjustment. For example, the attenuator 27 may have a range from zero to thirty decibels in steps of one decibel; the attenuator 28 may have a range from zero to three decibels in steps of one-tenth decibel; and the attenuator 29 may have a range of zero to one-tenth decibel in steps of one-hundredth decibel. As is well known these T pads or attenuators contain variable resistors arranged to attenuate a signal without changing the input impedance of the attenuator.

It will be understood, of course, that the values stated are illustrative, and the invention is not limited to the precise ranges of attenuation suggested. That is, the accuracy desired in the measurement and the minimum value of alternating current power to be measured will determine the actual dimensions of the attenuators. The attenuators 27 and 28 may be of a type heretofore known. The fine adjustment attenuator 29 may also be of the T-type with additional elements for increasing the fineness of adjustment.

As shown, the attenuator 29 comprises a pair of fixed-value series resistors 31 and 32, a pair of resistors 33 and 34 connected in series in a circuit shunting the bridge 11, and a pair of "parallel series" resistors 35 and 36 connected as a series pair shunting the resistors 31 and 32, which are in series with the bridge 11.

One of the shunt resistors 34 and one of the parallel-series 36 are adjustable in value and they are preferably provided with mechanically connected adjusting arms schematically represented by arrows 37 and 38 arranged to increase the resistance of one rheostat while decreasing the resistance of the other.

In order to avoid variations in direct current load on the source 12 and consequent variations in the current flowing through the milliammeter 13 when the attenuators are varied in adjustment, the attenuators are preferably matched to each other and to the bridge 11. For example, if the bridge arms each have a resistance of 125 ohms, the attenuators will be matched thereto so as to present a comparable impedance to the bridge circuit 11. For example, in the case of attenuator 29, resistors 31 and 32 in series with bridge 11 are each of a value of 125 ohms. The shunt circuit resistors 33 and 34, however, are of substantially greater resistance, for example, 3,000 ohms and 2,000 ohms respectively, and the series resistors 35 and 36 are substantially of less resistance, for example, 3 ohms and 2 ohms respectively, the values stated for the variable resistors 34 and 36 being the maximum values. For an illustrative system of the values stated, the milliammeter 13 may have a range of zero to 10 milliamperes, and the adjusting rheostats 15 and 16 may have maximum resistances of 300 and 20 ohms, respectively. It will be understood, of course, that the invention is not limited to the illustrative values stated, which have been given merely for the purpose of setting forth illustrative resistance relationships between the elements which have been found to operate satisfactorily.

Since the attenuators 27 and 28 are of the T-type, the upper terminals do not interpose any resistance, and a conductor 39 provides a zero resistance circuit through the attenuators 27 and 28 to upper terminal 41 of the attenuator 29, which is the upper end of the resistor 33. The connections to the lower terminals of the attenuators, however, interpose resistance in series with the circuit when the attenuators are adjusted for attenuation. Thus, except when the attenuators 27 and 28 are set for zero attenuation, resistance will be interposed by attenuators 27 and 28 in a circuit including the direct current source 12, the milliammeter 13, the adjusting rheostats 15 and 16, a conductor 42, the attenuator 27, a conductor 43, the attenuator 28, a conductor 44, the series resistors 31 and 32 of the attenuator 29 by-passed by the resistors 35 and 36, a conductor 45, the bridge input terminal 26, the bridge 11, the bridge input terminal 25, back to the source 12 through a conductor 46.

With this arrangement of the attenuators connected to the bridge 11 and the source 12, the load impedance on the source 12 remains constant and the voltage output is therefore unaffected by adjustment of the attenuators because they have a constant input impedance for all adjustment.

Preparatory to making power measurements with the bridge, the alternating current power input to the Wollaston wire unit 19 is cut off, and the apparatus is adjusted to give a zero power reading. This is done by setting the attenuators 27, 28 and 29 to minimum attenuation and adjusting the resistors 15 and 16 until the galvanometer 22 gives a null deflection, indicating that the bridge is balanced, and the Wollaston wire unit 19 has a predetermined resistance equal to resistances of the standard resistors 17, 18 and 21. The reading of the milliammeter 13 may then be noted, while maintaining a fixed power output thereafter. However, if a constant voltage source 12 is employed, this could be unnecessary for the brief interval of time required to make an alternating current power measurement.

Since the attenuators 27 and 28 are not my invention but apparatus available in the market, the internal operation thereof need not be described, and the zero attenuation adjustment is obtained by setting these attenuators to the zero points on their scales.

The attenuator 29 is set for minimum attenuation by setting the resistor-adjusting handles 37 and 38 to the values making the resistance 34 maximum and the resistor 36 minimum.

Before applying alternating-current power to the Wollaston wire unit 19, the attenuators 27, 28 and 29 are set for maximum attenuation to make sure that an excessive amount of power will not be supplied to the Wollaston wire unit 19. With the alternating current power applied, the attenuators are then reduced in attenuation adjustment until the null indicator 22 falls to zero, indicating that the dissipation in the Wollaston wire unit 19 and the resistance thereof have been restored to their predetermined standard value.

Since the resistance of the wire 19 depends upon its temperature, which in turn depends upon the total dissipation of energy therewithin regardless of whether the source of the energy is alternating or direct current, the alternating current power measured will be the difference between the direct current power input to the wire before the alternating current power is applied and afterwards. Since the apparatus is operated with a power input from the source 12 constant, the difference in direct current power with and without the application of alternating current power will be represented by the loss of direct current power in the attenuators 27, 28 and 29, and the alternating current power may therefore be measured by observing the attenuation settings of the attenuators 27, 28 and 29. Since the resistance values of the various elements of the apparatus may be measured, the total direct-current power consumption before application of alternating current power may be calculated. By adding the attenuation values corresponding to the settings of the three attenuators 27, 28 and 29, the total attenuation is ascertained. The previous value of direct-current power multiplied by the factor of attenuation gives the value of alternating current power, which equals the absorption of direct current power in the attenuators 27, 28 and 29 required to maintain constant dissipation of the Wollaston wire unit 19. It will be understood, of course, that the attenuators 27, 28 and 29 may be calibrated in terms of alternating current power measured instead of attenuation, if fixed values of voltage and resistance are used in the other parts of the apparatus.

In accordance with the provisions of the patent statutes the principle of operation of the invention has been described together with the apparatus now believed to represent the best embodiment thereof, but it is to be understood that the apparatus shown and described is only illustrative and that the invention may be carried out by other arrangements.

What is claimed is:

1. Apparatus for measuring alternating-current power, comprising a direct-current power bridge, one arm of which comprises a hot wire unit with means for supplying to the hot wire unit alternating current, the power of which is to be measured, a direct-current source, the output of which may be maintained constant, adjustable calibrated constant input impedance attenuator means, and connections from the direct-current source to said bridge and to said calibrated attenuator means for causing the attenuator means to absorb power according to the setting of the attenuator means, whereby the total power input to the hot wire unit may be maintained constant with variations in alternating-current input power by varying the adjustment of the attenuator means to absorb excess direct current power while retaining constant the effective impedance load for said direct current source.

2. Apparatus for measuring alternating-current power, comprising a direct-current power bridge, one arm of which comprises a hot wire unit with means for supplying to the hot wire unit alternating current, the power of which is to be measured, a direct current source, and calibrated constant input impedance attenuator means connected between said direct current source and said bridge, said attenuator means having a calibrated adjustment to vary the direct current power absorbed by said bridge while maintaining constant the total power drawn from said direct current source for measuring the alternating power absorbed by said unit.

EDWARD L. GINZTON.

REFERENCES CITED

The following references are of record in the file of this patent:

UNITED STATES PATENTS

| Number | Name | Date |
| --- | --- | --- |
| 1,121,835 | Hiatt | Dec. 22, 1914 |
| 1,957,454 | Gebhard | May 8, 1934 |
| 2,140,364 | Lee | Dec. 13, 1938 |
| 2,005,986 | Behr | June 25, 1935 |
| 1,590,420 | Chubb | June 29, 1926 |
| 1,791,563 | Horn | Feb. 10, 1931 |